Patented Jan. 2, 1940

2,185,967

UNITED STATES PATENT OFFICE 2,185,967

LINOXIN-LIKE MATERIAL AND PROCESS OF MANUFACTURE

Remmet Priester, Deventer, Netherlands, assignor to Naamlooze Vennootschap Industrieele Maatschappij Voorheen Noury & Van Der Lande, Deventer, Netherlands, a company of the Netherlands No Drawing. Application January 15, 1936, Serial No. 59,317

18 Claims. (Cl. 260—406)

The present invention relates to certain novel linoxin-like bodies and to the method of producing same. These products are suitable for use in the manufacture of linoleum, artificial leather, rubber substitutes and rubber compounding materials, and molded (or otherwise shaped) products of an analogous character.

Several modifications of the generic method of making these products will be discussed, by way of example.

(1) Drying oils, semi-drying oils or oils having some drying constituents, such as linseed oil, tung oil, perilla oil, soya bean oil, cotton seed oil, fish oils, whale oil (or others) are subjected to the known process of blowing with air, until the viscosity has been increased for example to 100 poises or higher. This operation can be continued to get a very high viscosity liquid oil. This can be done at about room temperature, under which condition the process is very slow, or preferably the blowing is effected while the oil is at an elevated temperature such as 100 to 300° C. In the latter case, it is sufficient to heat up the oil initially, after which the oxidation process may keep the oil hot, to some extent at least. This step, per se, is old.

(2) This oxidized liquid oil of increased viscosity may then be treated with a small amount only of a mineral acid to cause jellification. Acids of the type for example of sulphuric acid or phosphoric acid or sulphonated fatty oils, sulphonated castor oil, sulphonated aromatic bodies such as hydroxy aromatic sulphonic acid, e. g. sulphonated phenol or other sulphonated tar acids, naphthalene sulphonic acids, naphthol sulphonic acids, sulphonic acids of aromatic amines, e. g., anilin sulphonic acids or naphthylamine sulphonic acids, amino hydroxy aromatic sulphonic acids (these may be mono-sulphonic or poly-sulphonic acids), are very suitable. These are all strong acids.

a. Treatment with sulphuric acid can be carried out by mixing thoroughly with 0.1% of $H_2SO_4$ of 60% strength, this acid being thoroughly mixed with the said oxidized oil. A second addition of 0.1% of said acid may then be made. Several of such additions can be made, up to 0.5% or 1% or more in all. Or 0.5% to 1% or more, of said acid can be added in one batch, and thoroughly mixed with the said viscous oil. Thoroughly mixing the acid with the oil may require 10 to 30 minutes, more or less. The mass is then allowed to stand for 2 to 6 hours to form a jelly-like mass.

b. Phosphoric acid of 1.75 s. g. (about 90%) can be similarly used, say 0.2% to 2%, based on the weight of the oil.

c. The amount of sulphonic acid may be such as to give an acidity equivalent to the above stated quantity of sulphuric acid.

The sulphuric acid concentration can vary between about 50 and 80% and the phosphoric acid between about 50 and 100%. The sulphonic acid can be used in concentrated state, e. g., 50 to 100%. Mixtures of such acids can be used.

Either the sulphuric, phosphoric and/or sulphonic acid treatments will convert the bodied oil into a jelly-like mass.

The speed of the jellification as well as the stiffness of the jelly will depend on the amount and strength of the acids used, the greater the percentage and strength of added acid, the quicker the jellification will be accomplished.

The thickened oil, when adding the acid thereto, may be at room temperature.

It will be seen that the amount of sulphuric or other mineral acid, required for producing the stated effect, is small, not more than a few per cent, based on the amount of the oil. Quantities of sulphuric acid very greatly in excess of the amounts stated above, would be highly detrimental, large quantities even sulphonating the oil, and sulphonated oils would obviously be unsuitable for the present purposes, being water-soluble.

The jelly-like product is tacky at first and becomes less tacky on standing.

(3) The jelly-like material from the above steps, may then be baked at 50° C., for 8-10 hours, or at 100° C., for about 3 to 4 hours (these times and temperatures being given purely as illustrative), to give an elastic product which is somewhat rubbery. The baked product is very resilient and springy, in the pure state and in the form of mixtures or final products, as described below. The time of baking and the temperature used therein, can be varied. The longer the time and the higher the temperature in the baking step, the harder will be the product produced. This effect is produced without substantially darkening the product, which (in the absence of dark colored pigments etc., and if made from oils that are not of a very dark color) is still of a rather light color. The color at all stages depends somewhat on the color of the original oil used. The appearance and physical properties of this product are very similar to those of real linoxin. It can be powdered if desired, to be mixed with fillers, pigments or other binders and then molded or pressed upon a burlap backing, as in the ordinary manufacture of linoleum, from linoxin.

Steps 2 and 3 can be combined, if desired, into one operation, by adding the acid to the oil when warm or hot. By so combining the two steps, time, labor and apparatus may be saved.

The baking step is to some extent optional, and can be omitted if desired, particularly if a softer product is wanted. The hardening can be accomplished also at higher temperatures, but at temperatures very considerably above 100° C. (such as 200–300° C.) more darkening of the product will be produced. A good hardening without any darkening will also be accomplished by allowing the material to stand for several days or a week or more.

It is to be understood that in the present process, a single oil can be used alone, or mixtures of two or more oils can be used, and these oils may be of similar or different drying properties. Likewise mixtures of a well drying oil with preferably a small amount of a non-drying oil, the latter acting as a filler and modifying agent. Accordingly, in this specification and the claims thereof, the terms "oil" and "an oil" etc. are intended to be used in the generic sense meaning one or more oils.

The comminuted cork or other fillers, pigments, etc., can be added at any desired stage of the above process. But obviously if any filler or pigment is to be added that will neutralize the mineral acid, that filler or pigment will not be added until after said acid-treating step. Any of the usual fillers or additions commonly applied in the manufacture of linoleum, artificial leather, etc., can be added, in any desired amounts.

Depending on the proportions and stage of the process at which the fillers, pigments, etc. are to be added, the mode of incorporating the fillers can vary.

In another modification, the oil to be treated may first be heated to 200–400° C., for several hours (say 3 to 12 hours, more or less) to polymerize and body the oil before blowing the same (followed by the acid treatment and, optionally, the baking) all as described above.

In addition to manufacture of linoleum, the product can be used by mixing with such fillers as wood flour and/or textile fibers, or others, pigments, dyes, etc. and poured or trowelled or pressed into forms, or ground and/or sheeted between rolls, for various purposes.

The product can be roll-milled or ground in any other manner, (hot or cold) with rubber, rubber substitutes, fillers, colors, pigments, etc.

It is important to note that the linoxin-like products of the present case, are very light in color (in case no considerable amounts of dark colored or black pigments, dyes, or fillers have been added, and if the oils treated are not of a very dark color), and therefore are of a good quality.

The final products have a desirable degree of softness and resiliency or springiness, which is thereby imparted to linoleum and other floor coverings made therefrom. The floor coverings are resistant to wear, are free from objectionable odors even when crude smelly fish oil is used as the starting material.

Molded products have a high degree of strength, resiliency, toughness and workability, as well as a good appearance.

An important feature of the present process is that it is not necessary to add solvents to the linoxin-like material produced by the present process.

I claim:

1. In the process of producing a new linoxin-like material, the steps which comprises blowing with air an oil having drying properties sufficiently to greatly increase the viscosity of the oil, and then treating the same with an amount of a strong non-oxidizing oxygen-containing acid not substantially over 2% by thoroughly mixing the same, and allowing the product to stand until it is converted into a jelly-like mass.

2. In the process of producing a new linoxin-like material, the steps of blowing with air an oil initially having drying properties sufficiently to greatly increase the drying properties of the oil, and thereafter treating said oil with about 0.2 to 2% of a strong mineral acid selected from the herein described group consisting of sulphuric acid of about 50 to 80% strength and phosphoric acid of about 50 to 100% strength, and sulphonic acid of about 50 to 100% strength, and allowing the mixture to stand to form a jelly.

3. The process of producing a new linoxin-like material, which comprises first blowing with air, an oil initially having drying properties whereby the oil becomes thickened, and thereafter incorporating with said thickened oil, about 0.2 to 2% of a strong mineral acid selected from the hereindescribed group consisting of sulphuric acid of about 50 to 80% strength and phosphoric acid of about 50 to 100% strength, and sulphonic acid of about 50 to 100% strength, and allowing the mixture to stand to form a jelly, followed by heating to accelerate the hardening of the jelly.

4. The process of producing a new linoxin-like material, which comprises well incorporating with a blown and oxidized oil initially having drying properties, 0.2 to 2% of a strong acid selected from the herein described group consisting of sulphuric acid of about 50 to 80% strength and phosphoric acid of about 50 to 100% strength, and sulphonic acid of about 50 to 100% strength, and allowing the mixture to stand to form a jelly, and then heating the jelly to 50–100° C., to accelerate the hardening of the jelly.

5. In the process of producing a new linoxin-like material, which comprises oxidizing, by blowing with air, an oil initially having drying properties, well incorporating the oxidized oil with about 0.2 to 2% of a strong mineral acid selected from the herein described group consisting of sulphuric acid of about 50 to 80% strength and phosphoric acid of about 50 to 100% strength, and a strong sulphonic acid of about 50 to 100% strength, and allowing the mixture to stand to form a jelly, and incorporating with fillers, at any desired stage of the process.

6. A process of making a linoxin-like body which comprises blowing with air a fatty oil having drying properties, sufficiently to substantially increase the viscosity of the oil, and thereafter well incorporating about 0.2 to 2% of sulphuric acid of about 50 to 80% strength into said oil to convert the oil into a jelly-like body.

7. A process of making a linoxin-like body which comprises blowing with air a fatty oil having drying properties, sufficiently to substantially increase the viscosity of the oil, and thereafter well incorporating about 0.2 to 2% of phosphoric acid of about 50 to 100% strength into said oil to convert the oil into a jelly-like body.

8. A process of making a linoxin-like body which comprises blowing with air a fatty oil having drying properties, sufficiently to substantially increase the viscosity of the oil, and thereafter well incorporating about 0.2 to 2% of a strong sulphonic acid of about 50 to 100% strength into said oil, to convert the oil into a jelly-like body.

9. A process of making a linoxin-like body which comprises blowing with air a fatty oil having drying properties, sufficiently to substantially increase the viscosity of the oil, and thereafter well incorporating about 0.2 to 2% of sulphuric acid of about 50 to 80% strength into said oil to convert the oil into a jelly-like body and thereafter hardening the jelly-like mass.

10. A process of making a linoxin-like body which comprises blowing with air a fatty oil having drying properties, sufficiently to substantially increase the viscosity of the oil, and thereafter well incorporating about 0.2 to 2% of phosphoric acid of about 50 to 100% strength into said oil to convert the oil into a jelly-like body and thereafter hardening the jelly-like mass.

11. A process of making a linoxin-like body which comprises blowing with air a fatty oil having drying properties, sufficiently to substantially increase the viscosity of the oil, and thereafter well incorporating about 0.2 to 2% of a strong sulphonic acid of about 50 to 100% strength into said oil to convert the oil into a jelly-like body and thereafter hardening the jelly-like mass.

12. A process of producing a new linoxin-like material, which comprises polymerizing a drying oil by heat, blowing the same with air to increase its viscosity, well incorporating an amount of a strong non-oxidizing oxygen-containing acid not substantially over 2% with said thickened oil by thoroughly mixing the same and allowing the product to stand until it is converted into a jelly-like mass.

13. A process of producing a new linoxin-like material, which comprises blowing with air, under oxidizing conditions, an oil which has drying properties, initially mixing with the blown oil an amount of a strong non-oxidizing oxygen-containing liquid mineral acid not substantially over 2%, and allowing the product to stand until it is converted into a jelly-like mass, and thereafter heating said material sufficiently to accelerate the hardening of the jelly.

14. A process of producing a new linoxin-like material, which comprises polymerizing and blowing with air, an oil initially having drying properties, incorporating the polymerized and blown oil with an amount of a strong mineral acid not substantially over 2%, which acid is selected from the group consisting of sulphuric acid, phosphoric acid and strong sulphonic acids, and thoroughly mixing the same, and allowing the product to stand until it is converted into a jelly-like mass, followed by heating to 50 to 100° C. to accelerate the hardening of the jelly.

15. In the process of producing a novel linoxin-like material, the step which comprises thoroughly mixing blown, and thereby oxidized, oils initially having drying properties, with a strong non-oxidizing oxygen-containing liquid mineral acid in an amount not substantially over 2%, and allowing the mixture to stand until it is converted into a jelly-like mass.

16. As a new product, a linoxin substitute which has properties in general simulating the properties of real linoxin, but which contains reaction products of a blown oil having some drying properties, with about 0.2 to 2% of a strong acid selected from the group consisting of sulphuric acid, phosphoric acid and strong sulphonic acids, and which product is capable of being incorporated with fillers and pigments, to produce a linoleum-like product, which is resistant to washing with water and alkaline detergents.

17. As a new product, a linoxin substitute which has properties in general simulating the properties of real linoxin, but which contains reaction products of a blown oil having some drying properties with about 0.2 to 2% of a strong non-oxidizing, oxygen-containing mineral acid, and which product is capable of being incorporated with fillers and pigments, to produce a linoleum-like product, which is resistant to washing with water and alkaline detergents.

18. As a new product, a linoxin substitute which has properties in general simulating the properties of real linoxin, but which contains reaction products of a blown polymerized oil, having some drying properties, with about 0.2 to 2% of a strong acid selected from the group consisting of sulphuric acid, phosphoric acid and strong sulphonic acids, and which product is capable of being incorporated with fillers and pigments, to produce a linoleum-like product, which is resistant to washing with water and alkaline detergents.

REMMET PRIESTER.